3,165,737
ELECTRONIC ACQUISITION ELECTROMECHANICAL TRACKING RADAR SYSTEM
Alfred I. Mintzer, Riverton, N.J., assignor, by mesne assignments, to the United States of America as represented by the Secretary of the Navy
Filed Mar. 30, 1961, Ser. No. 99,647
2 Claims. (Cl. 343—7.3)

The present invention relates to a novel and improved radar system and more particularly to a novel and improved radar ranging system which provides the accuracy and flexibility of an electromechanical system and the speed and facility of an electronic system in lock-on acquisition and tracking performance.

Present precision tracking pulse radar ranging systems face three basic problems which require solution for satisfactory operation in searching out and tracking modern guided missiles and other supersonic speed targets. The rapidly moving target must be tracked accurately at ever increasing ranges; the system must provide accurate range data in convenient forms; and the system must acquire the rapidly moving target from relatively inaccurate designated range positions and velocities.

Two basic systems for providing automatic ranging data are in general use. They are electronic analog tracking and ranging system, and electromechanical analog tracking and ranging system. The electronic analog system generally exhibits the advantages of being non-complex hardware-wise and at the same time uses bandwidth that is limited only by the pulse repetition frequency of the radar system. The electronic analog system, however, is limited in the linearity and stability of its time base and relatively inflexible in its ability to provide various types of output data. The electromechanical analog system, on the other hand, provides high accuracy and may be adapted to supply a wide variety of range data outputs but is relatively complex, is heavy and bulky, and involves substantial bandwidth restrictions particularly where the acquisition of high speed targets from inaccurate designation sources is required.

It is therefore a principal object of the present invention to provide a novel and improved radar ranging system which largely incorporates and exhibits the advantageous features of the electronic analog ranging system as well as the electromechanical analog ranging system.

It is a further object of the present invention to provide a novel and improved radar ranging system which combines selected features of both said systems in a unique manner to utilize the advantageous aspects of the acquisition circuits of the electronic system and the automatic tracking circuitry and apparatus of the electromechanical system.

Other objects and many of the attendant advantages of this invention will be readily appreciated as the same becomes better understood by reference to the following detailed description when considered in connection with the accompanying drawings wherein.

Figure 1:
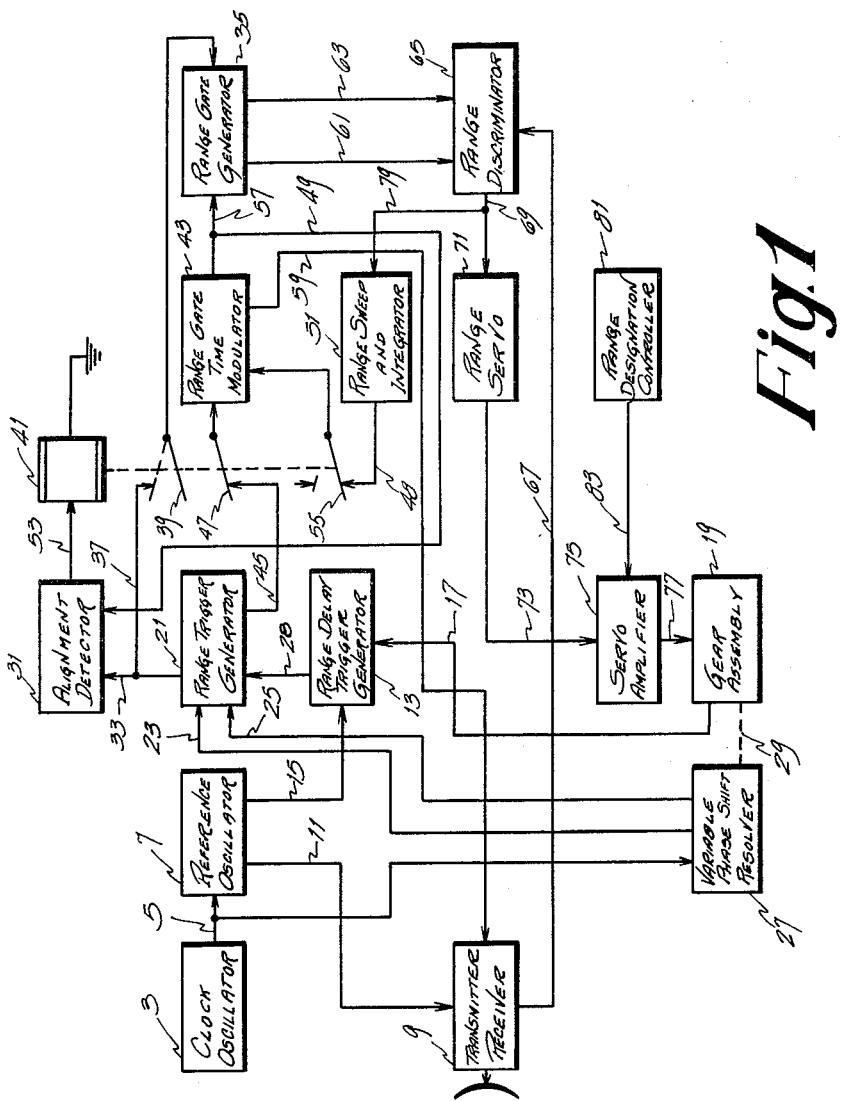
FIGURE 1 is a diagrammatic view of a preferred embodiment of the present invention.
Figure 2:
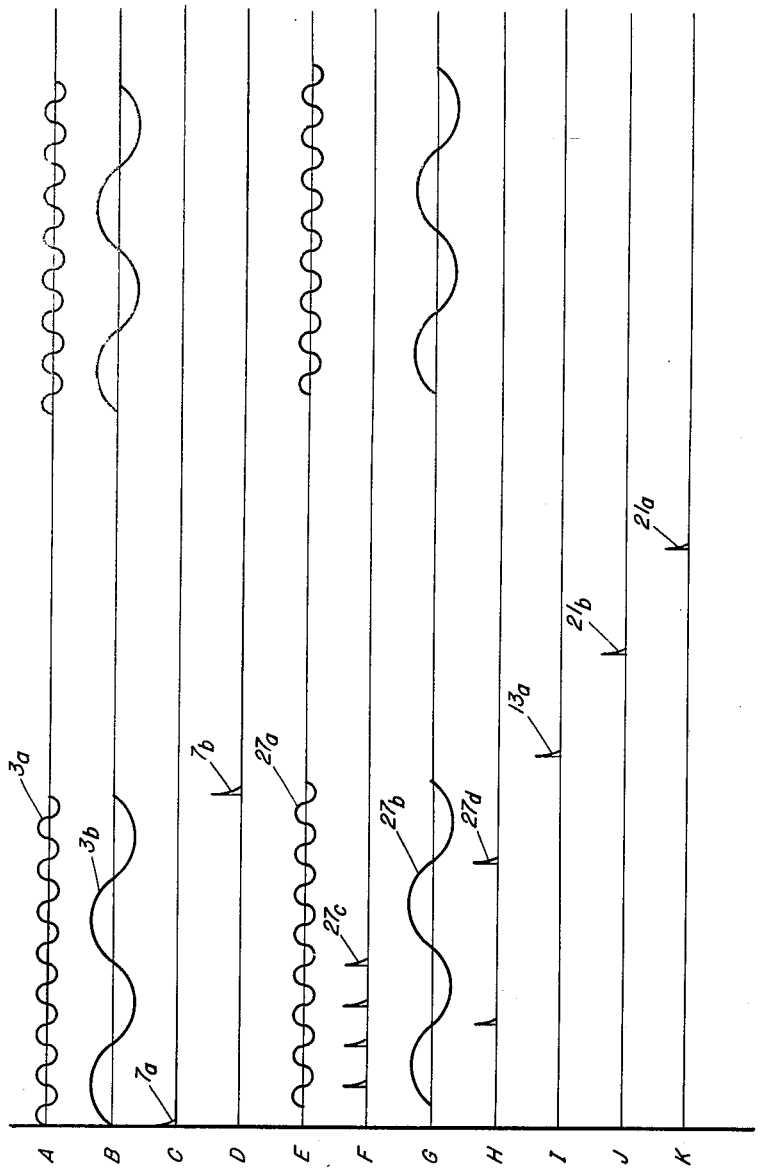
FIGURE 2 is a diagrammatic and graphical representation of input and output waveforms at various points in the embodiment of FIGURE 1.

A preferred embodiment of the present invention is illustrated in FIGURE 1 of the drawing. As shown therein, the clock oscillator 3 which preferably generates a fixed phase 82 kc. sine wave signal 3a and a fixed phase 20.5 kc. sine wave signal 3b such as those shown in FIGURES 2A and 2B of the drawing is coupled by conductor 5 to the reference oscillator 7. The reference oscillator is connected to the transmitter receiver circuit 9 by conductor 11 for energization of the latter with the pulse 7b having a predetermined pulse repetition frequency. The reference oscillator is also connected to the range delay trigger generator 13 by way of conductor 15 and provides the trigger generator 13 with the pulse 7a that occurs 16,000 yards prior to the transmitter energizing pulse 7b. The range delay trigger generator 13 includes a Miller integrator voltage rundown circuit which is initiated by the —16,000 yard pulse on conductor 15 and a voltage coincidence circuit in which the rundown voltage of the Miller integrator and the range voltage on conductor 17 from the gear assembly 19 are compared in a manner which will be more apparent hereinafter. The output circuit of the range delay trigger generator 13 is connected to the range trigger generator 21 by conductor 28. Range trigger generator 21 is also energized by variable phase 82 kc. and 20.5 kc. sine wave signals 27a and 27b which are respectively provided on conductors 23 and 25 by the variable phase shift assembly 27. The variable phase shift assembly 27 includes conventional resolvers which are mechanically coupled to the gear assembly 19 by a suitable mechanical linkage 29. The range trigger generator 21 provides a pair of output signals. A mechanical range gate output trigger 21a is coupled to the alignment detector 31 through conductor 33 and to the range gate generator 35 through conductor 37 and the armature 39 of relay 41; and a —1000 yard pre-trigger 21b is coupled to the range gate time modulator 43 through conductor 45 and armature 47 of relay 41. The alignment detector 31 is also energized by the electronic range gate trigger on conductor 49 from the range gate time modulator circuit 43. Relay 41 is energized by a circuit that extends from the alignment detector through conductor 53 and the relay to ground. The range gate time modulator 43 may also be energized by the electronic range gate voltage from the range sweep and integrator circuit 51 through conductor 48 and contact 55 of relay 41. The output circuit of the range gate time modulator 43 is coupled to the range gate generator 35 by conductor 57. An output circuit of time modulator 43 is also fed through conductor 59 to the transmitter receiver 9 for gating the video echo signals therein. Early and late gate signals are provided by the range gate generator 35 on conductors 61 and 63 for energization of the range discriminator circuit 65. Video echo signals from the transmitter-receiver circuit 9 on conductor 67 also energize the range discriminator 65. The range error voltage provided by the range discriminator 65 is used as will be more apparent hereinafter to control the disposition of the gear assembly 19 through a circuit that includes conductor 69, range servo 71, conductor 73, servo amplifier 75 and conductor 77. The range error voltage from the range discriminator is also fed through conductor 79 to the range sweep and integrator 51. The range designation controller 81 is also coupled to the gear assembly 19 through conductor 83 and the servo amplifier 75 and provides an initial setting of the gear assembly and the mechanical range voltage on conductor 17 in a manner that will be more apparent hereinafter.

In operation, an initial range voltage for the acquisition and tracking system of the present invention is manually set by the operator with a suitable adjustment of the range designation controller 81. A suitable voltage potentiometer or the like in the controller is set in accordance with information given the operator concerning the general position of the target to be tracked. The output voltage of the controller 81 is applied to the gear assembly 19 through the servo amplifier 75, and the gear assembly assumes a rotational position which represents the target range designated to the operator. Angular movement of the gear assembly 19 is converted to a course range voltage on conductor 17 by a suitable resolver or the like within the gear assembly and is fed to the range delay trigger generator 13 in a manner which will be more apparent hereinafter.

The clock oscillator 3 generates a fixed phase 82 kc. sine wave output signal 3a which synchronizes a fixed phase 20.5 kc. signal 3b also generated in oscillator 3. The 82 kc. and the 20.5 kc. signals are both applied to the variable phase shift resolver assembly 27. The mechanical linkage 29 from gear assembly 19 drives suitable resolvers or the like in the variable phase shift assembly to provide variable phase 82 kc. and 20.5 kc. sine wave signals 27a and 27b on conductors 23 and 25 that provide timing pulses in the range trigger generator 21 in a manner that will be more apparent hereinafter. The fixed phase 82 kc. signal from clock oscillator 3 is also fed through conductor 5 to energize the reference oscillator 7. Reference oscillator 7 generates a pre-trigger 7a which occurs 16,000 yards before the transmitter pulse 7b fed through conductor 11 to transmitter 9. This −16,000 yard pretrigger energizes a Miller integrator circuit in range delay trigger generator 13. The linear rundown voltage produced by the Miller integrator is compared in the range delay trigger generator 13 with the coarse range voltage provided by the gear assembly 19 on conductor 17. Since the coarse range voltage developed in the gear assembly is directly proportional to the designated range, the time of the linear rundown and the occurrence of the range delay output trigger 13a of trigger generator 13 on conductor 28 when the rundown voltage becomes equal to the coarse range voltage vary as a function of designated range.

The range delay trigger on conductor 28 and the variable phase 82 kc. and 20.5 kc. sine waves on conductors 23 and 25 from the variable phase shift assembly 27 drive range trigger generator 21. The range delay trigger on conductor 28 activates circuits in trigger generator 21 and these circuits select variable phase pips 27c and 27d which are used to provide the −1000 yard pre-trigger 21b on conductor 45 and the mechanical range trigger 21a on conductor 37. Relay 41 is normally deenergized such that the −1000 yard pretrigger on conductor 45 is normally fed through armature 47 of relay 41 to the range gate time modulator 43 where it energizes a Miller integrator circuit. As is set forth in detail in patent application of Alfred I. Mintzer and Anton J. Lisicky entitled Signal Detection Thresholding and Switching System, Serial Number 70,085 and filed on November 17, 1960, when the acquisition circuit of the range sweep and integrator 51 has not locked on a target, the range sweep and integrator operates as a sweep circuit. This relatively high frequency sweep voltage from the integrator 51 on conductor 48 is compared with the low frequency sweep rundown voltage triggered in the Miller integrator of the time modulator 43 by the −1000 yard pulse 21b from the trigger generator 21. When the rundown voltage of the Miller integrator and the sweep voltage from the integrator 51 become substantially equal, an electronic range trigger is produced on conductor 57 which energizes the range gate generator 35. The range gate generator produces early and late pulses which are applied to the range discriminator 65 through conductors 61 and 63. In the range discriminator the video echo signal on conductor 67 is applied to coincidence circuits which are successively enabled by the early and late gate pulses. If no video echo signal is received during either the early or the late gate the circuit continues to search about the mechanical range voltage until the target is encountered. When the target is encountered if the amount of video that occurs during the time of the early gate is not equal to the amount that occurs during the time of the late gate, a range error voltage is developed on output conductor 69 which is fed through the range servo 71 and the servo amplifier 75 to the gear assembly 19 to correct the coarse range voltage on conductor 17, and reset the occurrence of the range delay trigger of trigger generator 13 on conductor 28, the −1000 yard trigger on conductor 45 and the electronic range gate trigger on conductor 57. When the circuit has locked on the target and the servo system initiates an alignment operation whereby the mechanical range trigger and the electronic range trigger automatically approach time coincidence, the mechanical range trigger on conductor 33 and the electronic range trigger on conductor 49 are compared in the alignment detector 31. When these voltages become equal, relay 41 is energized and the mechanical range trigger is fed directly through conductor 37 to energize range gate generator 35.

It will therefore be noted that until the target is located, and the mechanical range voltage is aligned with the electronic range voltage, the range system is controlled by an electronic acquisition and tracking loop that includes the time modulator 43, the gate generator 35, the discriminator 65, and the sweep-integrator circuit 51. When alignment of the electronic and mechanical range voltages is accomplished and relay 41 is energized, the range system is then controlled by the electromechanical tracking loop that includes the trigger generator 21, the gate generator 35, the discriminator 65, the servo system 71, the servo amplifier 75, the gear assembly 19, and the delay trigger generator 13.

Obviously many modifications and variations of the present invention are possible in the light of the above teachings. It is therefore to be understood that within the scope of the appended claims the invention may be practiced otherwise than as specifically described.

What is claimed is:

1. In a radar range system:
   (a) a D.C. generator;
   (b) means coupled to the D.C. generator for manually controlling its output and developing a potential which represents a designated range of a preselected target;
   (c) a radar transmitter and receiver;
   (d) a reference oscillator coupled to the radar transmitter, said oscillator being adapted to develop periodic pulses for energization of the transmitter and a pretriggering pulse which precedes each pulse to the transmitter a predetermined amount;
   (e) a range trigger generator coupled to the D.C. generator and to the reference oscillator, said range trigger generator being responsive to the output potential of the D.C. generator and the pretriggering pulse of the oscillator to develop a mechanical trigger pulse that occurs an interval after each transmitter energizing pulse that represents the range of the target;
   (f) a range search circuit which is coupled to the range trigger generator and which sweeps about the mechanical trigger pulse;
   (g) a range gate time modulator coupled to the range search circuit for detecting the target within the search area and generating an electronic trigger pulse which also defines the range of the target;
   (h) a range gate generator which is coupled to the range gate time modulator and provides early and late gate pulses equally disposed before and after the electronic trigger pulse;
   (i) a range discriminator circuit which is coupled to the range gate generator and the radar receiver and which distinguishes the portion of a target echo signal from the receiver during the early and late gate pulses and provides a range error voltage;
   (j) means coupled to the range discriminator for adjusting the potential of the D.C. generator and for causing the mechanical and electronic trigger pulses to occur substantially simultaneously;
   (k) and means connected to the output circuits of the range trigger generator and the range gate time modulator for energizing the range gate generator with the mechanical trigger pulse.

2. In a radar range system:
(a) a D.C. generator;
(b) means coupled to the D.C. generator for manually controlling its output and developing a potential which represents a designated range of a preselected target;
(c) a radar transmitter and receiver;
(d) a reference oscillator coupled to the radar transmitter, said oscillator being adapted to develop periodic pulses for energization of the transmitter and a pretriggering pulse which precedes each pulse to the transmitter a predetermined amount;
(e) a range trigger generator coupled to the D.C. generator and to the reference oscillator, said range trigger generator being responsive to the output potential of the D.C. generator and the pretriggering pulse of the oscillator to develop a mechanical trigger pulse that occurs an interval after each transmitter energizing pulse that represents the range of the target;
(f) a range search circuit which is coupled to the range trigger generator and which sweeps about the mechanical trigger pulse;
(g) a range gate time modulator coupled to the range search circuit for detecting the target within the search area and generating an electronic trigger pulse which also defines the range of the target;
(h) a range gate generator which is coupled to the range gate time modulator and provides early and late gate pulses equally disposed before and after the electronic trigger pulse;
(i) a range discriminator circuit which is coupled to the range gate generator and the radar receiver and which distinguishes the portion of a target echo signal from the receiver during the early and late gate pulses and provides a range error voltage;
(j) means coupled to the range discriminator for adjusting the potential of the D.C. generator and for causing the mechanical and electronic trigger pulses to occur substantially simultaneously;
(k) a relay;
(l) means coupled to the output circuits of the range trigger generator and the range gate time modulator for energizing the relay;
(m) and means controlled when the relay is energized for coupling the mechanical trigger pulse output circuit of the range trigger generator to the range gate generator.

No references cited.

CHESTER L. JUSTUS, *Primary Examiner.*